United States Patent [19]
Okuda et al.

[11] 3,980,570
[45] Sept. 14, 1976

[54] SLIDING MEMBER HAVING ANTI-FRICTIONAL AND ANTI-STATIC PROPERTIES FOR A CASSETTE

[76] Inventors: Kensuke Okuda, No. 8, Ichigayadai, Shinjuku, Tokyo; Tadaaki Yoshida, No. 10-13, Nerima 3-Chome, Nerima, Tokyo; Koji Kase, No. 3-10, Umegaoka, Setagaya, Tokyo, all of Japan

[22] Filed: Mar. 3, 1975

[21] Appl. No.: 554,830

Related U.S. Application Data

[60] Continuation-in-part of Ser. No. 417,332, Nov. 17, 1973, abandoned, which is a division of Ser. No. 154,376, June 18, 1971, abandoned.

[30] Foreign Application Priority Data

June 18, 1970 Japan.................................. 45-59987

[52] U.S. Cl................................. 252/12.4; 252/12; 264/284; 264/293
[51] Int. Cl.²..................... C10M 5/00; C10M 7/00; B20C 17/00; B20B 11/08
[58] Field of Search................... 252/12, 12.2, 12.4, 252/12.6; 264/284, 293

[56] References Cited
UNITED STATES PATENTS

| | | | |
|---|---|---|---|
| 2,442,598 | 6/1948 | Harrison et al. | 264/284 |
| 3,752,731 | 8/1973 | Stiegler et al. | 264/284 |

FOREIGN PATENTS OR APPLICATIONS

| | | | |
|---|---|---|---|
| 1,163,950 | 9/1969 | United Kingdom | 252/12.4 |
| 1,166,253 | 10/1969 | United Kingdom | 252/12.4 |

*Primary Examiner*—Delbert E. Gantz
*Assistant Examiner*—I. Vaughn
*Attorney, Agent, or Firm*—Sughrue, Rothwell, Mion, Zinn and Macpeak

[57] ABSTRACT

A sliding member having anti-frictional and anti-static properties for a tape or film cassette of an audio- or video-tape recorder or a movie projector, comprising a thermoplastic resin containing 5 to 90% by weight of carbon fiber, said member having less than $10^8$ ohms of surface resistance and also having a coefficient of dynamic friction of less than 0.2.

5 Claims, 3 Drawing Figures

INVENTORS
KENSUKE OKUDA
TADAAKI YOSHIDA
KOJI KASE

BY Sughrue, Rothwell, Mion,
    Zinn & Macpeak

ATTORNEYS

SLIDING MEMBER HAVING ANTI-FRICTIONAL AND ANTI-STATIC PROPERTIES FOR A CASSETTE

CROSS-REFERENCE TO RELATED APPLICATIONS

This application is a continuation-in-part of application Ser. No. 417,322 filed Nov. 17, 1973, and now abandoned, which in turn was a division of application Ser. No. 154,376 filed June 18, 1971 and now abandoned.

BACKGROUND OF THE INVENTION

A tape or film cassette for an audio or video tape recorder or a movie projector, particularly for an 8 mm. movie projector, is normally constructed so as to take up and rewind a tape or film reciprocally between a pair of reels. Since the rewinding speed of the tape or film becomes very high, both edges of the tape or film receive a high degree of friction between the upper and lower reel surfaces. Therefore, it is necessary to insert a sheet having a low coefficient of friction between the tape or film and the reels as a sliding member.

Hitherto, paper coated with silicone resin or sheet coated with fluorocarbons has been used as the sliding member.

Recently, in order to enable the tape or film cassette to be played continuously for a long time, a correspondingly longer tape or film has been employed, and since the size of the cassette is restricted by the mechanism and configuration of the audio or video tape recorder or movie projector, this longer tape or film has been provided on the same size of reels by providing a tape or film of reduced thickness. However, when the thickness of the tape or film is reduced, both edges of the tape or film become sharper so that the surface of the sliding member is subjected to increased wear, especially upon high speed rewinding of the film or tape. For example, in many cases there is produced a fine skived powder on the surface of the sliding member engaged by the tape or film, and such fine powders penetrate between convolutions of the tape. As the result of this, in the case of an audio tape cassette, not only does this cause noise, but it also causes the winding speed, which should be constant, to vary irregularly. This reduces the high fidelity of reproduction.

Also, since fine grooves are produced on the member with the edges of the tape or film, the tape or film tends to become inserted into the grooves, so that the area of contact between the tape or film and the sliding member is increased, which subjects the tape or film to increased frictional resistance.

As a result, the winding speed of the tape or film becomes irregular. Further, since the thermal conductivity of the conventional sliding member is small, the frictional heat is not dissipated, but accumulates to the extent that the afore-mentioned phenomenon is further increased. In addition, since the conventional reels and tape or film are made of electrically insulating material, static electrical charge being generated due to the friction is not dissipated, the reels and tape or film and the sliding member attract the afore-mentioned fine skived powders and dust, and this causes noise or a bad visual image. For this reason, the high-fidelity of reproduction of the conventional tape or film cassette is reduced.

SUMMARY OF THE INVENTION

The object of this invention is to eliminate or reduce such undesirable phenomena. This invention provides a sliding member having anti-frictional and anti-static properties for a tape or film cassette, comprising a thermoplastic resin containing 5 to 90% by weight of carbon fiber, said member having less than $10^8$ ohms of surface resistance and a coefficient of dynamic friction less than 0.2.

BRIEF DESCRIPTION OF THE DRAWING

This invention is illustrated in the accompanying drawings, in which.

DETAILED DESCRIPTION OF THE INVENTION

Figure 1:
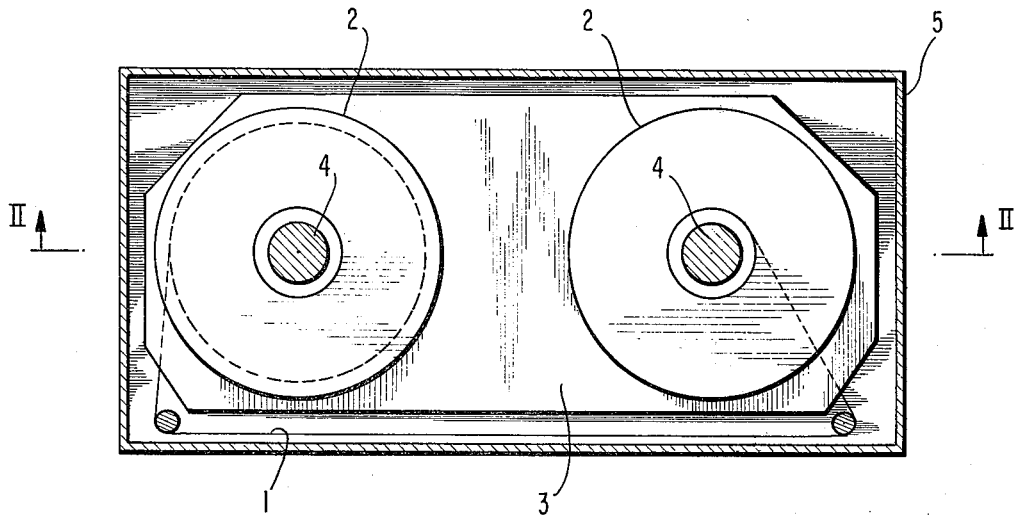
FIG. 1 is a plan view illustrating the general construction of a tape or film cassette with a top cover opened.

If the content of carbon fiber is less than 5% by weight, sufficient effect is not present, whereas if it exceeds 90% by weight, bonding by the synthetic resin is insufficient, so that a self-supporting product cannot be obtained.

In respect to the stiffness and brittlness of the said sliding member, it is more preferable to use the content of carbon fiber of 15 to 30% by weight in the mixing ratio to the thermoplastic resin.

In the content of carbon fiber is less than 15% by weight, the resultant sliding member, in the case of using the said member as a thin sheet less than 1 mm in thickness, may have insufficient stiffness, whereas if it exeeds 30% by weight, the resultant member becomes more brittle as in the same thickness. However, if the carbon fiber is used in the range of preferable content described above, the resultant thin sheet has suitable stiffness and toughness for the sliding member according to this invention. In addition, the said thin sheet has an electrical surface resistance of $2\times10^2$ to $3\times10^2 \Omega$ and a coefficient of dynamic friction (against plastic plate) of 0.07 to 0.15. Moreover, these values are sufficiently effective values, respectively, for the purpose of this invention. Therefore, the result can be able to provide an excellent sliding member for a tape or film cassette. The carbon fiber used to make the said sliding member should preferably have an electrical resistivity of less than $10^{-2} \Omega$ -cm; and a diameter of 3 to $30\mu$. It may be obtained by baking synthetic fiber or pitch fiber in an inert gas atmosphere above 800°C, and if the baking temperature is below this, the electrical property and mechanical property becomes insufficient for the purpose of this invention. This invention uses preferably a thermoplastic resin having good lubricating and mechanical properties, such as polyfluorocarbons, including polytetrafluoroethylene, polyvinyl fluoride, polyvinylidene fluoride or polytrifluorochlorethylene or their copolymers; polyacetals, including polyoxymethylene or its copolymers; polyamides such as Nylon-6, Nylon-66, etc., polyolefins, including polyethylene or polypropylene or their copolymers; or polyesters, including polyethyleneterephthalate or its copolymers, and polycarbonates.

A process for fabricating composite sheet material according to this invention may be carried out in conventional manner, for example by a method of forming a film by mixing carbon fiber with resin or a method of forming paper or a web by mixing carbon fiber with resin and bonding by heating under pressure to sinter the thermoplastic resin, or a method of casting the product with the same or different thermoplastic resin.

The sliding member of this invention is preferably so made so as to enable one to produce a sheet of 0.05 to 0.5 mm. in thickness. Preferably, the surface of said sliding member is formed so as to present an uneven surface comprising microscopic concavities and convexities with minute projections of carbon fiber therein. This can be done by pressing said member between two stainless steel bands which are electrodeposited with chromium in roughened finish or between a pair of rolls having a roughened hard surface. The stainless steel bands or a pair rolls to be employed in the pressing process according to this invention is usually employed so as to make a matted finish upon a decorative thermoplastic sheet or film. This results in a contacting area of the member with edges of the tape being lessened so as to reduce the friction and wear and to improve the electrical dischargeability.

Figure 2:
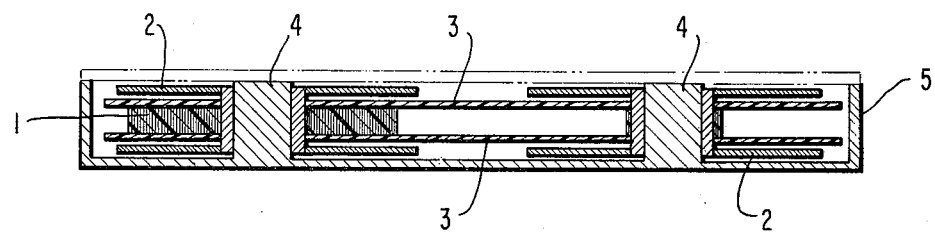
FIG. 2 is a front sectional view of the cassette taken along the line II—II in FIG. 1.

Referring to the drawings, and particularly to FIGS. 1 and 2, reference numeral 1 illustrates a tape, 2 a reel, 3 a sliding member disposed between the tape or film cassette and the reels, 4 is a shaft, 5 an outer frame.

Figure 3:
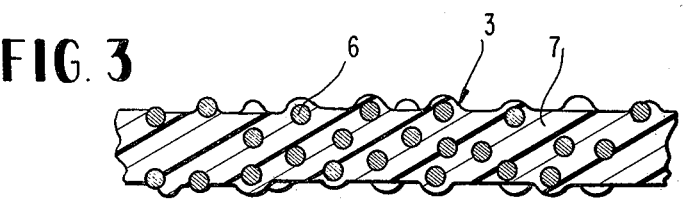
FIG. 3 is an enlarged sectional view of a sliding member according to one embodiment of this invention.

In FIG. 3, numeral 6 shows a section of carbon fiber, and 7 a synthetic resin, but 6 does not always have a predetermined orientation, and 7 is not always limited to only a continuous phase.

The invention is further illustrated in the following Examples.

EXAMPLE 1

A high density polyethylene powder having a melt index of 6.5 and carbon fibers of $10\mu$ average diameter, 3 mm average length and $8\times10^{-3}\Omega$-cm electrical resistivity were mixed in the ratio of 80 parts of polyethylene powder to 20 parts of carbon fiber, by weight, for 20 minutes. The resulting mixture was charged into an extruder (of 50 mm. in diameter, 1000 mm. in screw length, 2.53 in compression ratio and 3.25 mm. in depth of screw groove) and extruded through a T-shaped die (of 60 mm. in die width and 0.4 mm. in lip) heated at about 190°C, and passed through a take up roll heated at about 60°C, and wound up on a winding apparatus to make a primary sheet of 0.4 mm. in thickness.

The sheet had $3\times10^2\Omega$ in surface resistance, and was sufficiently anti-static but had a dynamic friction coefficient of 0.16–0.17 (against Derlin at 100 g in load and 50 RPM). The sheet was put between two stainless steel bands, which were sandblasted with No. 80 blasting sand and were electrodeposited with chromium in roughened finish layer, of 0.24 mm in thickness and was rolled by means of rolls heated at about 180°C to make a sheet of 0.1 mm. in thickness having a microscopically embossed surface.

The sheet so made has an uneven surface comprising microscopic concavities and convexities and was observed to have minute projections caused by the carbon fibers therein projecting from its surface, and also had a coefficient of dynamic friction as low as 0.07 to 0.09 and thus was recognized to have excellent properties for a sliding member in a tape or film cassette.

EXAMPLE 2

Carbon fibers of average diameter of $10\mu$, average length 3 mm. and electrical resistivity $8\times10^{-3}\Omega$-cm. and Nylon-66 chopped fibers in 3 mm. length of 3 denier filaments were mixed in the ratio by the weight of 25 of the carbon fibers to 75 of Nylon-66 fibers. Further polyvinyl alchol fibers of 3 mm. in average length and 3 denier were added to the resulting mixture in the ratio of 5 parts by weight of polyvinyl alcohol fiber to 100 parts by weight of the mixture. The mixture thus obtained was stirred in water of 2000 parts, by weight, for about 1 hour in order to mix and disperse the fibers uniformly. By filtering the above dispersed mixture through a wire net of 300 U.S. mesh as used in paper making, a wet web was obtained.

When the web was heated at 115°C and dried, the polyvinyl alcohol fibers were dissolved in the remaining water and dried up completely, and at the same time combined with the other fibers. As the result of this, a stable web was obtained. Next, by holding the dried-up web under a pressure of 80 kg/cm² for 3 minutes in a press machine heated at 230°C, the Nylon-66 fibers were melted and a sheet 0.08 mm. in thickness containing carbon fibers was obtained.

The sheet thus obtained has a density of 53.48g/m² and partial exposures of carbon fibers were microscopically observed on its surface. The electrical surface resistance of this sheet was low, as $2\times10^2\Omega$, and its coefficient of dynamic friction was 0.12 – 0.15 (c.f., polyamide containing no carbon fiber had an electrical surface resistance higher than $10^{12}\Omega$ and its coefficient of dynamic friction was 0.29)

As mentioned above, the sheet thus obtained was recognized to be extremely excellent as a sliding member with respect to antistatic properties and slidability.

Since the novel sliding member of this invention comprises thermoplastic resin, which has toughness against wear and low coefficient of friction, containing carbon fiber which also has excellent toughness against wear and electrical conductivity, it can facilitate smooth take-up and rewind of the tape or film.

In comparison with the conventional material, it is more wear resistant, but less abrasive on the tape or film. Since the electrical resistance of the composite produce is limited to below $10^8\Omega$, the article does not attract dust due to the generation of static electricity and yet the frictional heat may be dissipated by the electrical and heat conductivity of the carbon fiber.

Accordingly, even if thin tape or film giving a long playing time is used, the sliding member may be used for a long time without deterioration.

What we claim is:

1. A sheet-like sliding member having anti-frictional and anti-static properties for use with a tape or film cassette comprising a thermoplastic resin containing 5 to 90% by weight of carbon fiber, and formed so as to have an uneven surface comprising microscopic concavities and convexities with minute projections of carbon fiber on the surfaces, said member having a surface resistance of less than $10^8\Omega$ and a coefficient of dynamic friction of 0.07 to 0.15, said carbon fiber having a diameter of 3 – 30 microns.

2. A sliding member as claimed in claim 1, wherein said carbon fiber has an electrical resistivity less than $10^{-2}\Omega$-cm and a diameter 3 to 30 $\mu$.

3. A sliding member as claimed in claim 1, wherein said thermoplastic resin is selected from the group consisting of polyfluorocarbons, polyacetals, polyamides, polyolefins, polyesters and polycarbonates.

4. A sliding member as claimed in claim 1, containing 15 to 30% by weight of carbon fiber, said member having an electrical surface resistance of $2\times10^2\Omega$ to $3\times10^2\Omega$.

5. The sliding member of claim 1, wherein said carbon fiber has an average diameter of 10 microns.

* * * * *

UNITED STATES PATENT AND TRADEMARK OFFICE
CERTIFICATE OF CORRECTION

PATENT NO. : 3,980,570
DATED : September 14, 1976
INVENTOR(S) : Kensuke OKUDA et al It is certified that error appears in the above-identified patent and that said Letters Patent are hereby corrected as shown below:

In the Heading Insert:

ASSIGNEES: KUREHA KAGAKU KOGYO KABUSHIKI KAISHA
No. 8, Nihonbashi Horidome-Cho 1-Chome,
Chuo-Ku, Tokyo, Japan, and TOYO BOSEKI KABUSHIKI KAISHA
No. 8, Dojima Hamadori, 2-chome,
Kita-ku, Osaka 530, Japan.

Signed and Sealed this

First Day of February 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,980,570          Dated September 14, 1976

Inventor(s) Kensuke Okuda et al.

It is certified that error appears in the above-identified patent and that said Letters Patent are hereby corrected as shown below:

In the Heading Insert:
    RELATED U.S. APPLICATION DATA:

After Serial No. 417,332, delete "Nov.17," insert -- Nov. 19. --.

*Signed and Sealed this*

Tenth *Day of* May 1977

[SEAL]

Attest:

RUTH C. MASON
*Attesting Officer*

C. MARSHALL DANN
*Commissioner of Patents and Trademarks*